United States Patent [19]
van der Lely

[11] 3,974,630
[45] Aug. 17, 1976

[54] MOWING MACHINE
[76] Inventor: Cornelis van der Lely, 7, Bruschenrain, Zug, Switzerland
[22] Filed: Apr. 29, 1974
[21] Appl. No.: 465,100

[30] Foreign Application Priority Data
Apr. 27, 1973 Netherlands ................... 7305887

[52] U.S. Cl. .................................. 56/295; 56/16.2
[51] Int. Cl.² ......................................... A01D 55/18
[58] Field of Search ................... 56/295, 11.9, 15.9, 56/16.2, 6

[56] References Cited
UNITED STATES PATENTS

| | | | |
|---|---|---|---|
| 2,669,826 | 2/1954 | Watrous | 56/295 X |
| 2,673,437 | 3/1954 | Pollock et al. | 56/11.9 |
| 2,707,859 | 5/1955 | Walker | 56/295 |
| 2,859,582 | 11/1958 | Babcock | 56/295 |
| 3,184,907 | 5/1965 | Harloff | 56/295 |
| 3,469,378 | 9/1969 | Heesters et al. | 56/295 X |
| 3,507,102 | 4/1970 | Kline et al. | 56/295 X |
| 3,715,874 | 2/1973 | Goserud | 56/295 |
| 3,735,572 | 5/1973 | Kasberger | 56/16.2 |

*Primary Examiner*—Russell R. Kinsey
*Attorney, Agent, or Firm*—Mason, Mason & Albright

[57] ABSTRACT

A mowing machine has a laterally extending frame part of a coupling frame part and a plurality of rotary circular cutters mounted on the laterally extending part. Driving means, including an in-going shaft connected to the prime mover power take off, is geared through boxes to an upwardly extending shaft of each rotary cutter. The cutters are rotatable at speeds above 3500 r.p.m. Each cutter has deflectable wires or pivotable blades around its periphery defined by a freely rotatable screen that overlies the gear housing in the cutter. A circular bottom of each cutter is designed to follow the ground contours.

11 Claims, 14 Drawing Figures

MOWING MACHINE

The invention relates to a mowing machine comprising cutters adapted to rotate about upright shafts and fastened to at least one rotor.

According to the invention the cutting speed of the cutters is at least 85 ms/sec. preferably at least about 90 ms/sec., whilst the diameter of the rotor is larger than 25 cms and smaller than 50 cms.

It is found that under these conditions a comparatively low power is required for the mowing operation, while due to the high speed of rotation of the rotors the machine may be of a very light-weight structure.

For a better understanding of the invention and to show how the same may be carried into effect, reference is made by way of example to the accompanying drawing.

Figure 1:
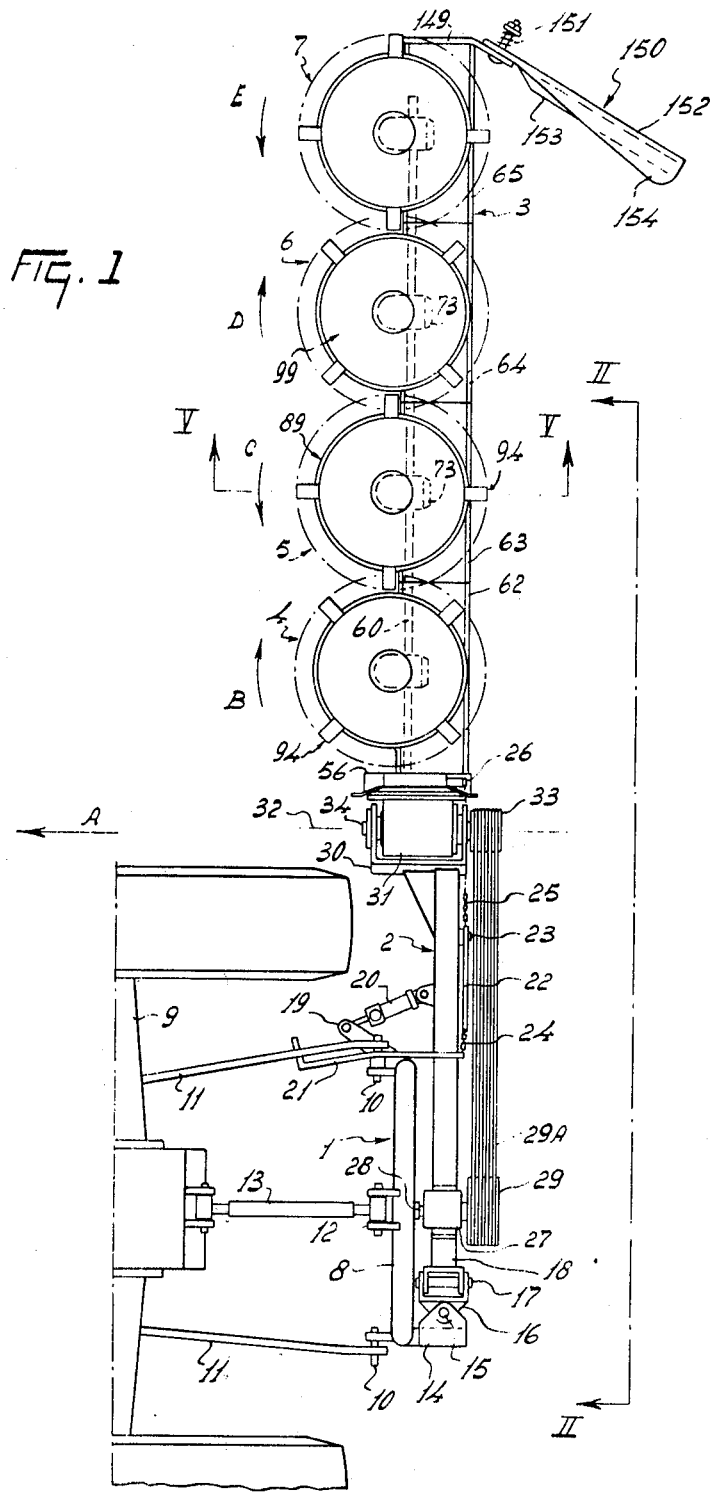
Figure 2:
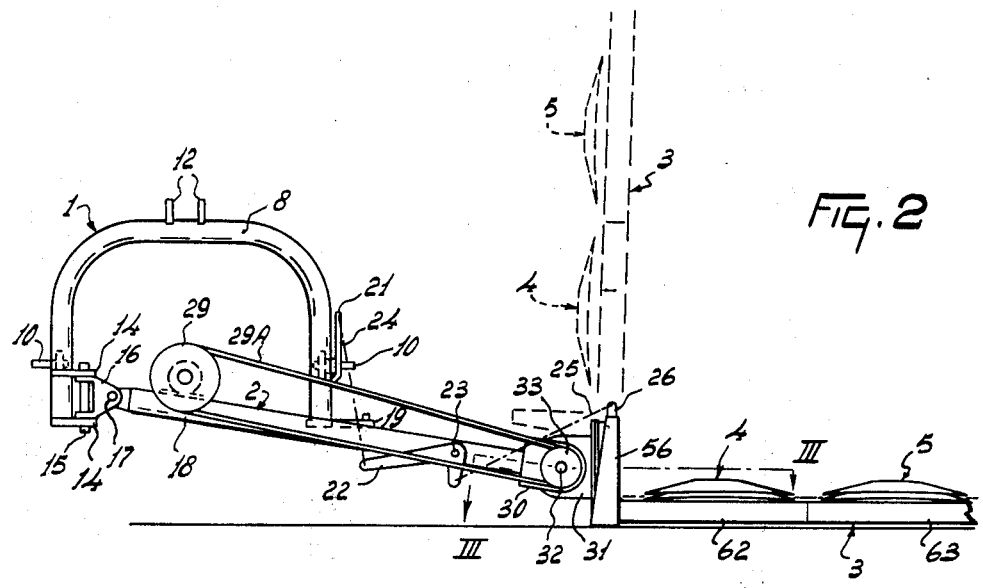
Figure 4:
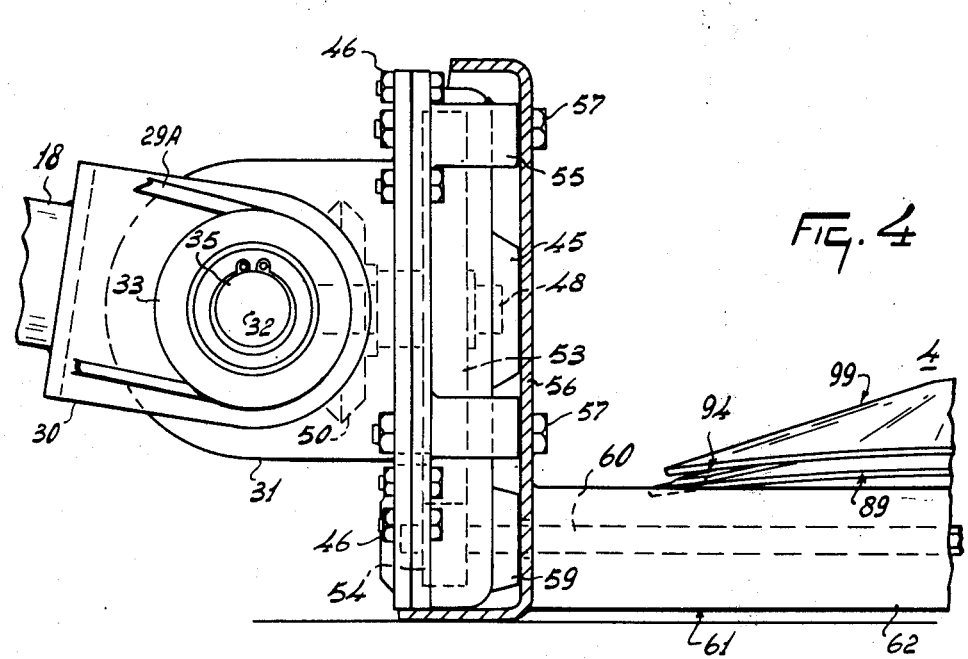
Figure 3:
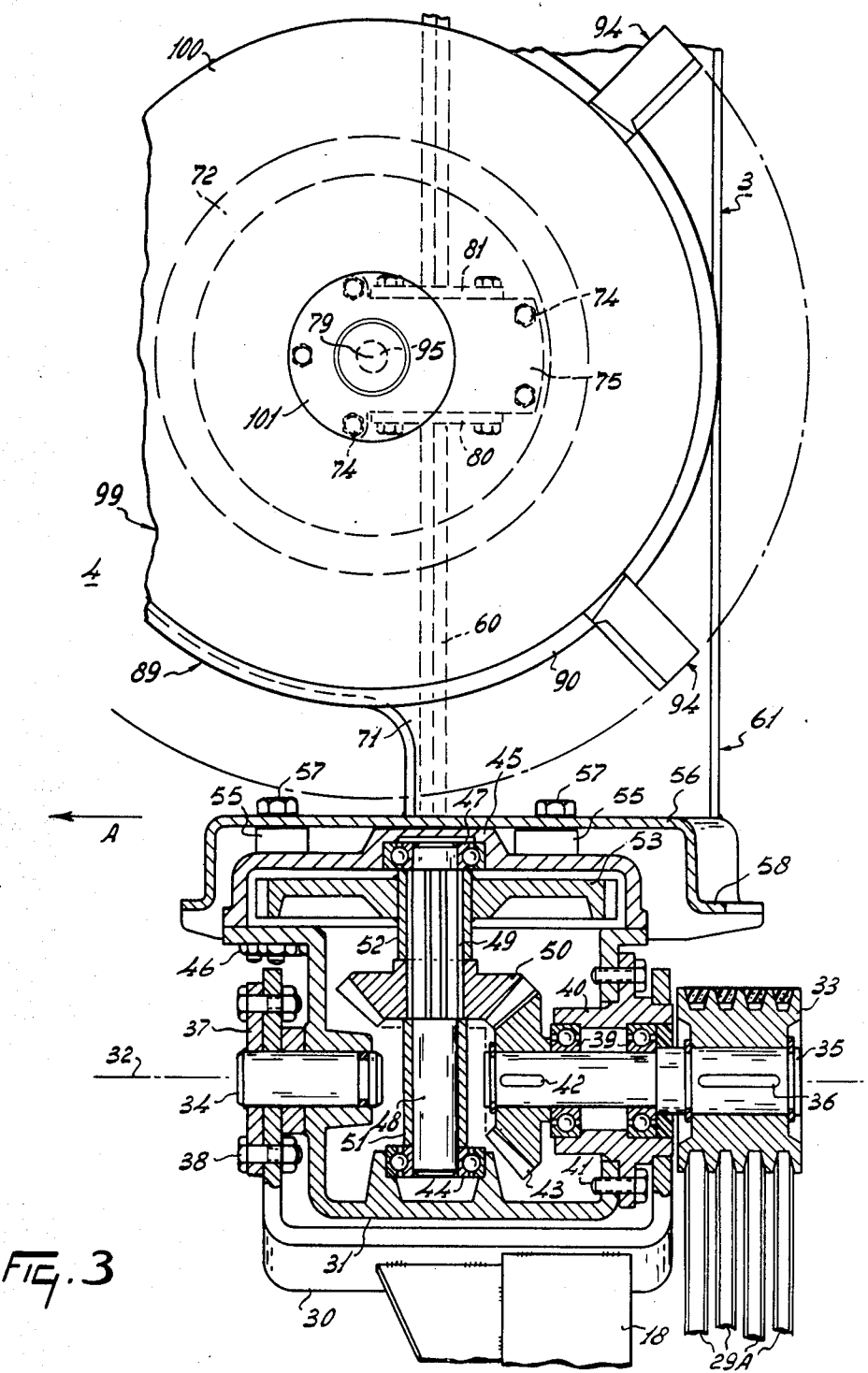
Figure 5:
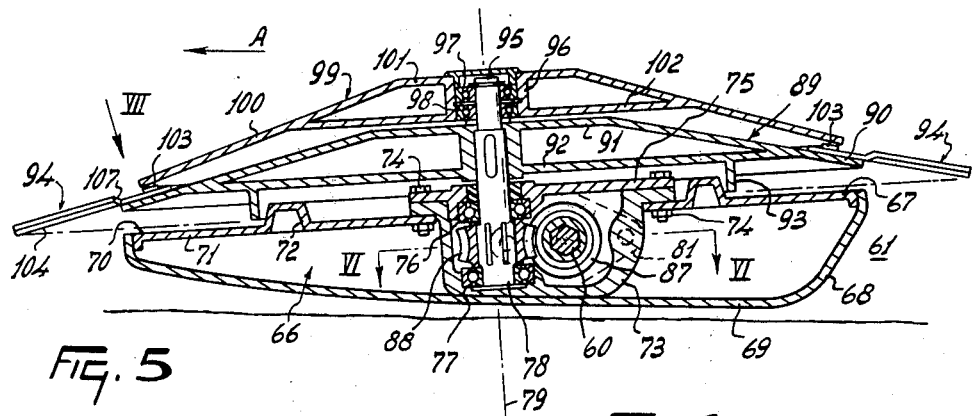
Figure 7:
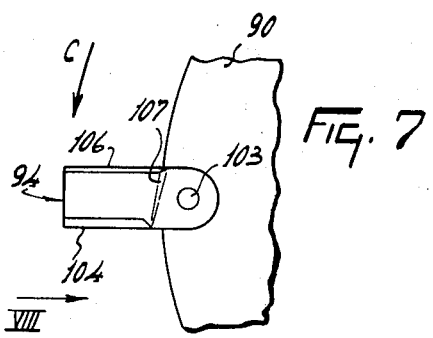
Figure 6:
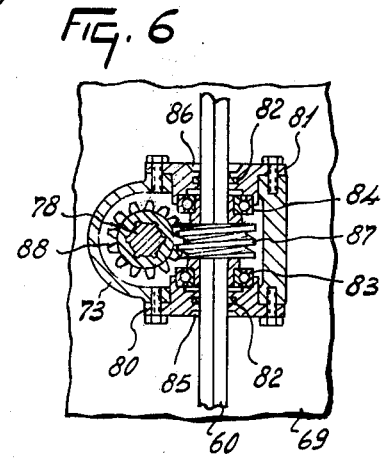
Figure 8:
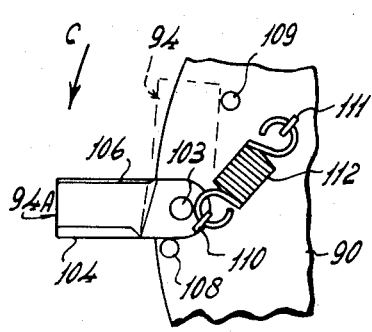
Figures 9, 10:
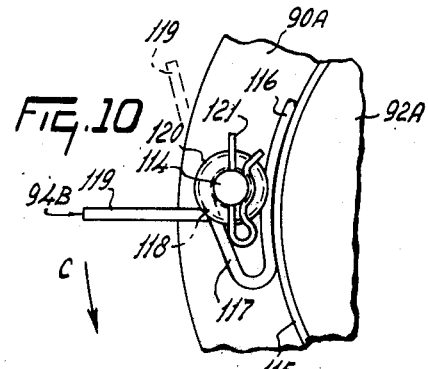
Figure 11:
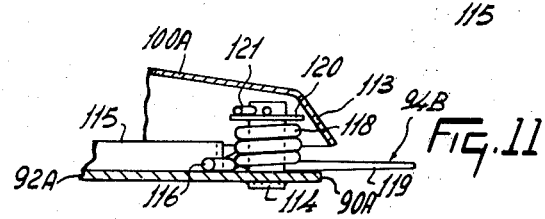
Figure 12:
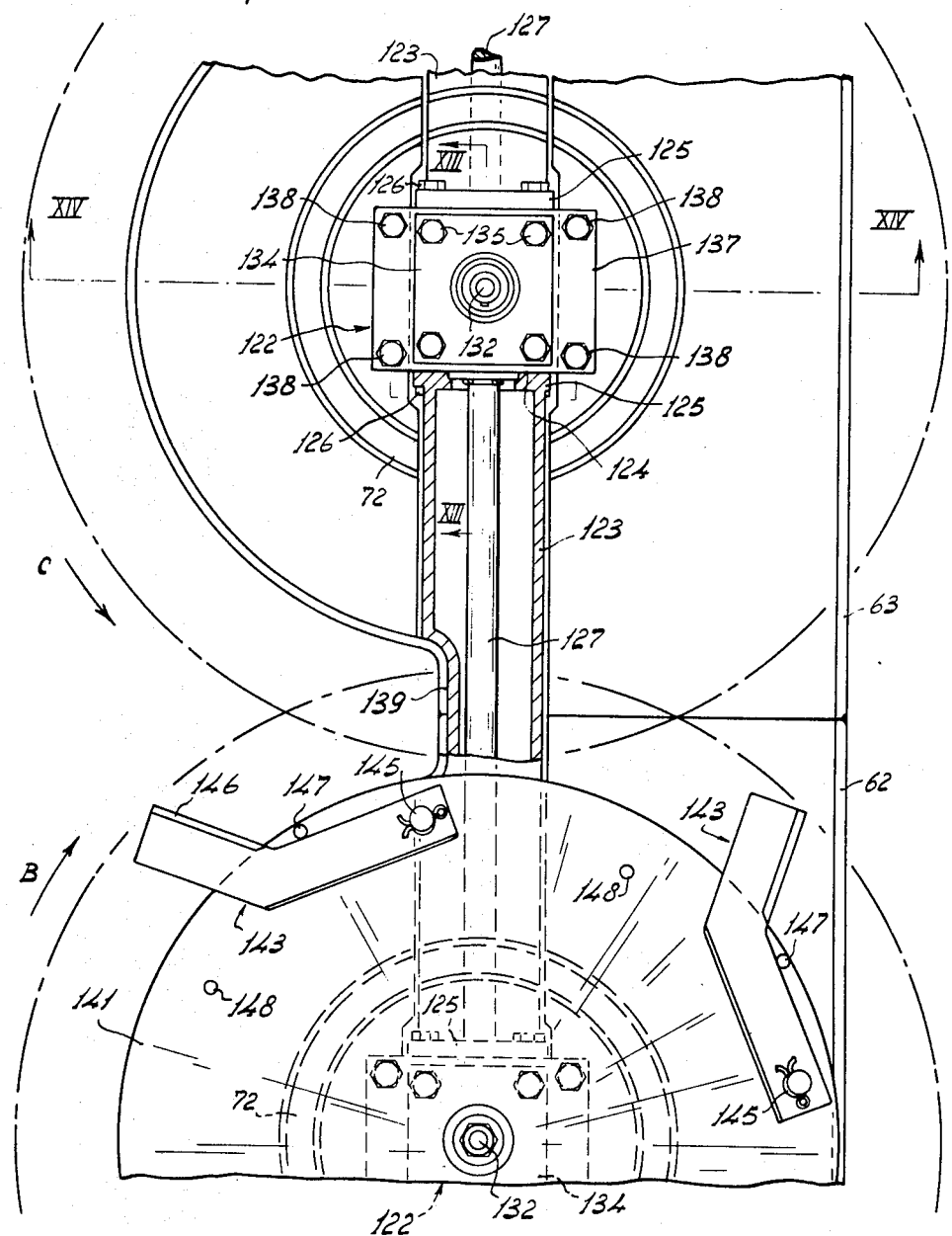
Figure 13:
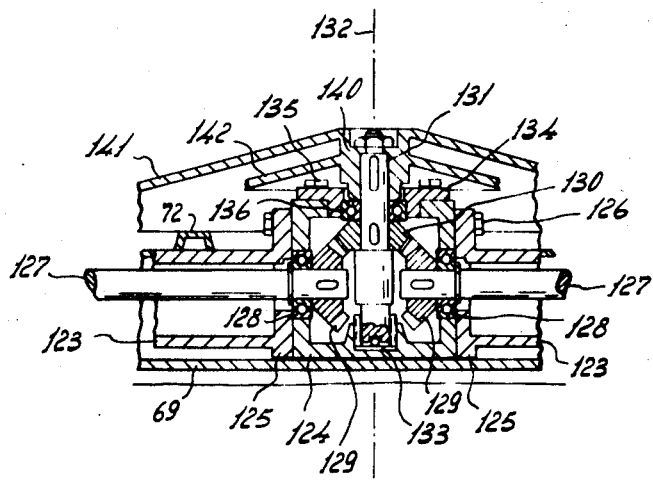
Figure 14:
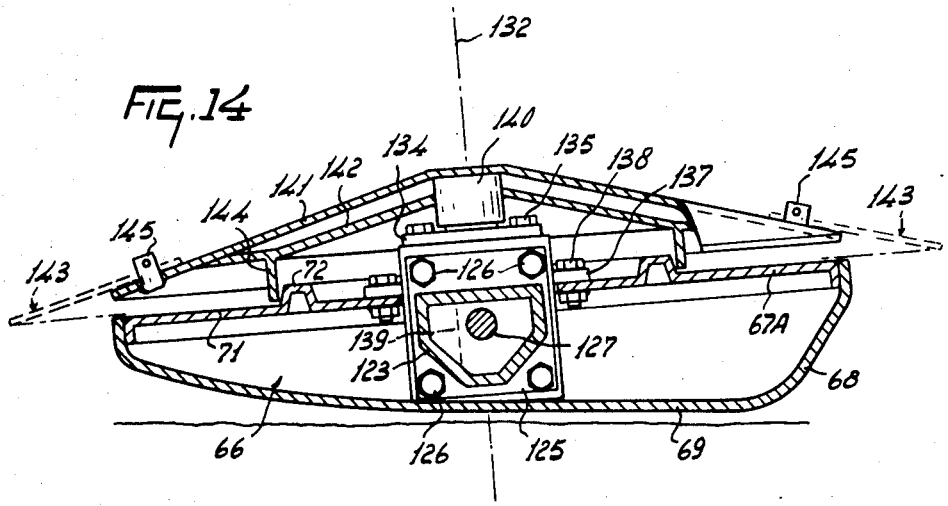

FIG. 1 is a plan view of a machine embodying the invention, attached to a tractor, FIG. 2 is a rear view of a portion of the machine shown in FIG. 1 in the direction of the arrows II—II in FIG. 1, FIG. 3 is an elongated sectional view of a portion of the device taken along section line III—III of FIG. 2, FIG. 4 is a rear view with portions shown in cross section of part of the machine shown in FIG. 3, FIG. 5 is an enlarged sectional view of a mowing rotor taken along section V—V in FIG. 1, FIG. 6 is a sectional view of the drive of a mowing rotor taken along section line VI—VI in FIG. 5, FIG. 7 is a plan view of a mowing cutter in the direction of the arrow VII in FIG. 5, FIG. 8 is a front view of a mowing cutter in the direction of the arrow VIII in FIG. 7, FIG. 9 is a plan view similar to FIG. 7 of a second embodiment of the mower cutter, FIG. 10 is a plan view similar to FIG. 7 of a third embodiment of the mower cutter, FIG. 11 is an elevation of the mowing cutter section shown in FIG. 10, FIG. 12 is partly a plan view and partly a sectional view of a second embodiment of part of the machine shown in FIG. 1, FIG. 13 is a sectional view taken along section line XIII—XIII in FIG. 12, FIG. 14 is a sectional view taken along section line XIV—XIV in FIG. 12, The machine shown comprises a fastening portion 1, a supporting member 2 and a supporting beam 3, holding rotors 4 to 7 (FIGS. 1 and 2). The fastening portion 1 comprises a hitch or trestle 8 in the form of an inverted V or U, the plane of symmetry of which coincides with the longitudinal plane of symmetry of a tractor 9 moving the machine. Near the two free ends of the trestle 8 are secured horizontal pins 10, extending at right angles to the direction of movement A and inserted into holes provided near the hindmost ends in the lower lifting arms 11 of the lifting device of the tractor, whereas near the topmost part of the trestle 8 fastening means 12 are provided for coupling with the hindmost end of a top bar 13 associated with the lifting device of the tractor 9. The trestle 8 formed by a curved tubing extends in operation parallel to an approximately vertical plane transverse of the direction of movement A. This position may, however, be varied since the length of the top bar 13 is variable. Near one of the free ends of the trestle 8, viewed in the direction of movement A, a fork 14 is fastened behind said trestle, said fork comprising two parallel, approximately horizontal plates spaced one above the other, each of which has a hole arranged so that the center lines of the two holes are in line with each other and are inclined upwards as shown. Said center lines constitute at the same time the center line of a pivotal shaft 15, which is generally vertical and inclined in an upward and forward direction, viewed in the direction of movement A. The pivotal shaft 15 is located behind the trestle 8, near one of the free ends thereof. The pivotal shaft 15 holds a pivotable coupling member 16, which serves as a support bearing for a pivotal shaft 17, which is spaced a small distance from the pivotal shaft 15. The pivotal shaft 17 is located, viewed from the rear, between the pivotal shaft 15 and the central vertical longitudinal plane of symmetry of the tractor 9. A supporting tubing 18 is pivotally arranged on the pivotal shaft 17 so that the supporting tubing 18 is connected with the trestle 8 by means of a universal hinge comprising one of the pivotal shafts 15 and 17. The supporting tubing 18 extends laterally from pin 17 toward and beyond the most remote rear tractor wheel.

The free end of the trestle 8 remote from the fork 14 is provided with a forwardly and laterally inclined arm 19. Between the free end of the arm 19 and the supporting tubing 18 is a safety device 20 that prevents, in normal operation of the machine, the supporting member 2 from turning to the rear, when given forces on the supporting beam 3 or rotors 4–7 are exceeded, whereas it allows the supporting beam 3 to turn about the pivotal shaft 15. The safety device 20 is connected as shown in FIG. 1. The pin 10 furthest remote from the fork 14 is provided with a pivotable rocker 21. The foremost end of the rocker 21 is inserted in operation beneath the lifting arm 11 concerned and is bent over upwardly when viewed from the rear so that the hindmost end is located at a distance above pin 10 and rearwardly of the supporting tubing 18. On the rear side of the supporting tubing 18 a transverse lever 22 is pivotable about an approximately horizontal pivotal shaft 23, extending approximately horizontally in the direction of movement A, while the ends of the substantially L-shaped lever 22 are connected by means of chains 24 and 25, or the like with the hindmost end of the rocker 21 and the stop end of an upright lever 26, fastened rigidly to the neighbouring end of the supporting beam 3. The supporting tubing 18 holds a substantially cylindrical housing 27, which comprises the bearing of an in-put shaft 28 and which is disposed so that is substantially horizontal axis is located approximately in the central vertical plane of the tractor 9. The outgoing shaft of the housing 27, viewed on plan, is located behind the supporting tubing 18, where it is provided with a multiple pulley 29, which is adapted to rotate about a rotary shaft extending parallel to the center line of the pivotal shaft 17. The end of the supporting tubing 18 remote from the fork 14 is provided with a fork 30, in which a gear box 31 is pivotally journalled about a pivotal axis 32 extending parallel to the centre line of the pivotal shaft 17. The gear box 31 and the supporting beam 3 rigidly secured thereto are, therefore, adapted to turn about the pivotal axis, 32 with respect to the supporting tubing 18 of the supporting portion 2. On the rear side the gear box 31 is provided with a multiple pulley 33, which is disposed relatively to the pulley 20 so that the grooves intended for the same belts are at equal distances from a plane at right angles to their relatively parallel rotary shafts. The pulleys 29 and 33 in this embodiment have four grooves each intended to receive v-belts 29A.

The gear box 31 (FIG. 3) is pivotally journalled in the fork 30 by means of a stub shaft 34 and a shaft 35, the center lines of which are aligned and constitute the pivotal axis 32. The pulley 33 is fixed by means of a key 36 to the rear end of the shaft 35, viewed in the direction of movement A. The stub shaft 34 is stationary in the gear box 31 and projects out of the box 31 to the front, viewed in the direction of movement A. The stub shaft 34 is journalled in a manner not shown, for example by means of a bushing, in a bearing plate 37, which is fastened by means of bolts 38 near one of the free ends of the fork 30. The shaft 35 is journaled in bearings 39 in the gear box 31, said bearings 39 being accommodated in a bearing housing 40, which is secured by bolts 41 to the gear box 31. The shaft 35 projects from the front side of the bearing housing 40, viewed in the direction of movement A, and is provided with a bevel gear wheel 43 fastened by means of a key 42. Adjacent the supporting tubing 18 the gear box 31 is provided with a bearing 44 so that the center line thereof is parallel to the center line of the supporting tubing 18 and is located between the proximal ends of the stub shaft 34 and the shaft 35. The side of the gear box 31 remote, in operation, from the supporting tubing 18 has secured to it a vertically elongated, dish-shaped gear wheel housing 45 so that the housing 45 faces the gear box 31 by its open side, whereas an upright axis of symmetry of the housing 45 is disposed so that it intersects the prolongation of the center line of the bearing 44. The housing 45 is detachably connected by bolts 46 with the gear box 31. The gear wheel housing 45 comprises a bearing 47, the center line of which registers with that of the bearing 44. The bearings 44 and 47 receive a shaft 48, the center line of which intersects at right angles of the center lines of the stub shaft 34 and of the shaft 35, which latter as stated above coincide with the pivotal axis 32. On the side remote from the bearing 44 the shaft 48 is provided over approximately half its length with key ways 49. This part of the shaft 48 is provided with a bevel gear wheel 50 having internal key ways corresponding with the key ways 49. The shaft 48 and the bevel gear wheel 50 are mounted with respect to the shaft 35 and the bevel gear wheel 43 so that the gear wheel 50 is in mesh with the gear wheel 43. Between the bearing 44 and the gear wheel 50 a spacer sleeve 51 surrounds the shaft 48. Between the side of the gear 50 remote from the bearing 44 and the side of the bearing 47 facing the bearing 44 a sleeve 52 surrounds the key-way portion of the shaft 48. The gear wheel 50 is thus fixed in place with respect to the gear box 31 and the housing 45 in the direction of the center line of the shaft 48 by means of the spacer sleeve 51 and the sleeve 52. To the sleeve 52 is welded a spur gear wheel 53, which is located between the gear wheel 50 and the bearing 47 and the pitch of which exceeds the outer dimensions of the gear box 31, measured in the direction of the pivotal shaft 32. The sleeve 52 is provided with internal toothing corresponding with the key ways 49 of the shaft 48 for driving the gear wheel 53. The gear wheel housing 45 has a slightly elongated shape and is disposed relatively to the gear box 31 so that the larger dimensions is vertical, while the gear wheel housing 45 is partly located beneath the gear box 31. The gear wheel housing 45 has an internal space located, measured in the vertical direction, by about 40% of the vertical dimension of the gear box 31, beneath said box (FIG. 4). Said space accommodates a spur gear wheel 54, the axis of rotation of which is parallel to the center line of the shaft 48, said gear wheel being in mesh with the gear wheel 53. The diameter of the pitch circle of the gear wheel 54 is about 20% of that of the gear wheel 53. The center line of the rotary shaft of the gear wheel 54 is located approximately vertically beneath the center line of the shaft 48. On the side of the gear wheel housing 45 remote from the supporting tubing 18 a number of, for example four, spacer sleeves 55 having internal screwthread are fastened rigidly to the housing 45, the head faces thereof remote from the gear box 31 being located in the same plane which is at right angles to the center line of the shaft 48. These head faces of the spacer sleeves 55 are joined by a rigid mounting cover 56, which is secured by bolts 57 to the spacer sleeves and hence to the gear wheel housing 45. The cover 56 is dish-shaped and arranged so that its open side surrounds the gear wheel housing 45, whereas the bottom of said dish is located adjacent the gear wheel housing 45 remote from the bearing 44 and at right angles to the center line of the shaft 45. The cover 56 has a bent-over rim 58 for stiffening purposes.

The gear wheel 54 is rotatably held in a bearing 59 and is seated on a hexagonal driving shaft 60, the center line of which extends parallel to that of the shaft 48. The driving shaft 60 is located inside a hollow supporting beam 61, which holds the rotors 4 to 7 and is rigidly secured to the lower end of the face of the cover 56 remote from the supporting tubing 18 so that, viewed in a horizontal direction, the supporting beam 61 is completely located beneath the lowermost horizontal plane of the gear box 31. In the mounted state the supporting beam 61, like the gear box 31, the gear wheel housing 45 and the cover 56, is located laterally of the wheels of tractor 9 at the left side thereof with respect to FIG. 2. The supporting beam 61 is secured to the cover 56 so that the lower edge of the supporting beam 61 is located approximately at the height of the lower edge of the cover 56 and, in operation, slightly above the ground surface. The supporting beam 61 comprises in this case four identical supporting beam portions 62 to 65. Each of these portions 62 to 65 has a straight rear edge, viewed on plan (FIG. 1) and the portions are secured to each other so that these straight rear edges are in line with each other. Each portion is furthermore bounded by head faces or side walls that extend at right angles to said rear edge and extend in the direction of movement A. The portions 62 to 65 are fastened to one another at said head faces or fastened by such a head face to the cover 56 by welding or other appropriate means. The front edges of the portions 62 to 65 extending between the head faces, viewed on plan, have near the two head faces of each portion, parts which extend parallel to the straight rear edge of each portion, while there between a semi-circular portion of the front edge is located, the center of which is located in front of the straight parts of the front edge located near the head faces. The supporting beam 61 extends freely outwardly and laterally from the tractor.

Each of the portions 62 to 65 (see portion 63 in FIG. 5) is formed viewed in a section, by a hollow beam 66, which is closed on the top side for the major part by a lid 67 and 71, which has, viewed on plan, the same shape as the aforesaid lid of each of the portions 62 to 65. The beam 66 comprises, in a sectional view, a partially spherical support 68 extending from the rear edge in downward and forward direction, said part 68 terminating further to the front in an approximately flat bottom 69. The bottom 69 is slightly bent upwards, viewed in the forward direction and terminates near the front edge in an upright rim, the end of which is located in the top surface 70, in which is also located the top side of the beam 66. The lids 67 and 71 located at said front and rear edges are welded to the front and rear walls of the beam 66 and has its top boundary surface located in the plane 70. In operation the plane 70 is at a small angle of about 5° to 10° to the horizontal and has therewith a line of intersection located, viewed in the direction of movement A, in front of the machine and being, in operation, viewed on plan, at an angle of 90° to the direction of movement A. In the lid 67 and 71 there is arranged a stiffening part 72, which is circular viewed on plan. The lid 67 and 71 has at its center an opening accommodating a gear box 73 so that it is located for the major part beneath the lid 71, its lower side bearing on the top surface of the bottom 69 of the beam 61. The gear box 73 is detachable fastened to the lid 67 and 71 by means of bolts 74. The gear box 73 has a lid 75, which is also fastened with the aid of the bolts 74 with respect to the gear box 73. In the lid 75 and in the gear box 73 are provided bearings 76 and 77 respectively holding a shaft 78, the center line of which is at right angles to the plane 70. The shaft 78 has approximately half its length beneath the lid 75 in the gear box 73 and the other approximately half its length above the lid 75. Viewed in the direction of movement A, the shaft 78 is arranged, (FIG. 5), approximately centrally of this sectional area of the beam 66, whereas the center line 79 of the shaft 78 intersects the bottom 69 in front of the support 68. The gear box 73 has detachable bearing covers 80 and 81 (FIG. 6) having packings 82 and bearings 83 and 84 on the side where the shaft 60 enters said box and on the side respectively where it leaves the same. Each bearing cover 80 and 81 is provided on the outer side with a feeler surface shaped in the form of part of a conical surface, the tip of which is located inside the gear box 73 and which is located around a hexagonal opening in the covers 80 and 81, which opening corresponds to the outer circumference of the driving shaft 60. The center lines of said openings are in line with each other. Between the two bearing covers 80 and 81 a helical gear or wheel 87 is held by the bearings 83 and 84. The worm gear 87 has a hole of hexagonal boundary in accordance with the outer circumference of the driving shaft 60 (FIG. 6). Near the lower end of the shaft 78 (FIG. 5) a worm gear 88 is arranged by means of keys on the shaft 78 and engages the worm gear wheel 87.

The end of the shaft 78 projecting above the lid 75 is provided by means of a key 78A with a supporting member 89, which is circular viewed parallel to the center line 79 and the diameter of which is approximately equal to the width of the beam 61, measured in the direction of movement A. The supporting member 89 has a top 90 with a conical surface, the tip of which is located on the center line 79 and which terminates near the shaft 78 in a top plate 91 extending parallel to a plane normal to the center line 79. Near the circular outer edge of the top 90, the latter is connected to a supporting plate 92, which is parallel to a plane normal to the center line 79. The supporting plate 92 has a cylindrical rim 93, which intimately surrounds the circular stiffening part 72 in a radial direction and serves as a barrier against dirt. Near the circular circumference of the top 90 a number of mowing cutters 94 to be described more fully hereinafter are fastened. The top end of the shaft 78 has the shape of a stub 95 of smaller diameter than the further part of the shaft 78. A bearing housing 96 is arranged around the stub 95 for holding two bearings 97 and 98, one above the other, the inner rings of which embrace the stud end 95. To the bearing housing 96 a top portion in the form of a detachable dish 99 is fastened and positioned above the supporting member 89. The dish 99 has an upper conical surface 100, which is located on the center line 79 above the upper point of the shaft 78. The surface 100 being approximately parallel to the conical surface of top 90 of supporting member 89. The surface 100 is secured by means of a plate 101 to the bearing housing 96, said plate 101 being parallel to a plane at right angles to the center line 79. Substantially midway between the circular free edge of the surface 100 and the fastening area of the plate 101, the dish 99 has a circular supporting plate 102, the inner rim of which is rigidly secured to the bearing housing 96. The dish 99 is freely rotatable on the shaft 78 by means of the bearings 97 and 98 with respect to the supporting member 89.

The cutter 94 (FIG. 7) is detachable and pivotally secured by means of a pin 103 secured to the supporting member 89 to the top side of the top 90 of said supporting member. The cutter 94 can be removed from the supporting member 89 by slipping it off the pin 103 in the upward direction. The pin 103 has its center line normal to the plane to which the top 90 is locally parallel. Said center line is the genetrix of a conical plane, the axis of symmetry of which coincides with the center line 79, the top being located beneath the beam 66. The cutter 94 is made from spring steel sheet, which is substantially at right angles to the center line of the pin 103. The cutter 94, viewed parallel to the center line of the pin 103, has a substantially rectangular shape, but on the side of the pin 103 facing the shaft 78 in operation, it has a semi-circular end. The cutter has a thickness of about 1 mm and is freely pivotable about the pin 103. The portion of the cutter 94 projecting in a radial direction beyond the top surface 90 is bent over through an angle of about 7.5° with respect to the portion of the substantially flat cutter located around the pin 103, so that the cutting edge 104 of the cutter 94 is located with respect to a plane going through the outermost point of the cutting edge 104, at right angles to the center line 79 and with respect to the lower end of the shaft 78, at a lower level than the edge 106 of the cutter 94 remote from the cutting edge 104, viewed opposite the direction of rotation C. The top surface of the cutter 94 extends, away from the edge 106, that is to say against the direction of rotation C over said angle in an upwardly inclined direction (FIG. 8). The portion of the cutter 94 located between the cutting edge 104 and the rear edge 106 is bent over with respect to the portion around the pin 103 along a setting rim 107, which is at a small angle of about 10° to the local tangential line.

The shape of the cutter 94A in a second embodiment (FIG. 9) is identical to that shown in FIGS. 7 and 8. However, top 90 is provided with two stops 108 and 109 in the form of pins, the center lines of which are parallel to the center line of the pin 103. The stop 108 is located, measured in the radial direction, at a larger distance from the center line 79 than that of the pin 103. With respect to the pin 103 the stop 108 is arranged on the top surface 90 so that, when the cutter 94A is in its radial position determined by centrifugal force, a side of the cutter in line with the cutting edge 104 is in contact with the stop 108. Measured in a radial direction the stop 109 is located at a smaller distance from the center line 79 than the pin 103 and arranged so that the rear edge 106 of the cutter 94A is just in contact with the stop 109, when the cutter is in a tangential position (broken lines in FIG. 9). In this embodiment an eye 110 is fastened to the cutter 94 and an eye 111 is provided on the top 90. When the cutter 94A occupies the radial position determined by centrifugal force, the eye 110 is located, viewed in a radial direction, between the center line of the pin 103 and the center line of the pin 108 and at a smaller radial distance from the center line 79 than the pins 103 and 108. In a radial direction, the eye 111 is located between the center line 79 and the pin 109 on the top 90. Between the eyes 110 and 111 is stretched a tensile spring 112, which tends to press the edge of the cutter 94, which is in line with the cutting edge 104, against the stop 108. The surface 100 of the dish 99 from the shaft 78 is located near its outer rim above the pin 103 and prevents the cutter from loosening in operation. In all embodiments four cutters are provided for each rotor and displaced in phase over 45° with respect to the cutters of adjacent rotors.

FIGS. 10 and 11 show an embodiment of a cutter 94B which cuts the crop by chopping rather than by mowing. In this embodiment the top 90A may be considered as a prolongation of the supporting plate 92A. The surface 100A of the dish 99 has in this embodiment near its outer circumference, a rim 113, which is bent down more than the surface 100A itself. Near the outer edge of the plate 92A a plurality of pins 114 are welded thereto, the major part of the length of said pins projecting above the top surface of the plate 92A. On the top side of the plate 92A is provided a cylindrical stiffening rim 115, which is coaxial to the center line 79. The height of this cylindrical rim 115 is approximately equal to half the length of the pin 114 projecting above the plate 92A. The cutter 94B is made in this embodiment from a single length of spring steel wire. The inoperative end 116 of this length of spring steel wire is located on the top side of the plate 92A and extends, viewed parallel to the center line 79, along the cylindrical outer circumference of the rim 115. The end 116 is located so that on either side of a radial line going through the center line of the pin 114 it has approximately the same length. At the end remote from the free end, the part 116 terminates via a bend of about 180° in a straight portion 117, which is substantially tangential to the outer rim of the top surface 90A and radial to the circumference of the pin 114, approaching this pin at a point located on the side of the pin remote from the rim 115. The portion 117 is, from said bend up to the point of approach to the pin 114, at a small angle to the top side of the plate 92A so that the portion 117 extends upwardly away from the coil with respect to the plate 92A. Near the pin 114 the portion 117 terminates in a plurality of coils 118, which surround the pin 114. The coils 118 terminate near a point at the circumference of the pin 114, which is located between the portions 116 and 117, viewed in the direction of the coil. The number of complete turns in this embodiment is about 2¼. At the point of termination of the turns 118 the length of spring steel wire terminates in an operative straight portion 119, which extends radially of the center line 79 and tangentially to the pin 114 and bears by its lower side on the top side of the plate 92 and forms the operative portion of the cutter 94 by its portion projecting beyond the plate 92. In this embodiment (FIG. 11) the operative portion 119 is chamfered in tapering fashion away from the pin 114, viewed parallel to the plate 92. The pin 114 and the turns 118 are screened against dirt by the rim 113 of the dish. The coils are enclosed on the top side by a ring 120, which is held in place by a clip 121 passed through a bore in the pin 114.

FIGS. 12 to 14 show a different form of the supporting beam portions 62, 63, 64 and 65. Corresponding parts are designated by the same reference numerals. The lid of each of the supporting beam portions 62 to 65, is not provided in this embodiment with an opening for accommodating a gear box 73 as is the case in the FIG. 5 embodiment but a gap extends over the whole length (measured transversely of the direction of movement A) of the frame beam portion is provided, said gap being defined by edge portions that are parallel to the rear edge of the supporting beam and parallel to the center line of the driving shaft 60. The stiffened part 72 in the lid has a circular shape, but at the area of said gap it is interrupted. In this gap in the top side of the beam 66 an essentially prismatic driving member is arranged over substantially the whole length of the beam 3. The driving member 122 comprises a plurality of essentially prismatic, elongated boxes 123, which are provided on both ends or on one end respectively with detachable gear boxes 124 so that a gear box 124 is arranged between two adjacent boxes 123 (FIGS. 12 to 14). The box located at the side of the mounting cover 56 is welded directly to that cover. Each box 123 has the same dimensions and has, in the direction of movement A, a substantially rectangular section, the lower corners being, however, drastically chamfered (FIG. 14). Each box 123 is provided near one or both ends with a flange 125 and is fastened to the gear box 124 by means of bolts 126 in said flange. A circular-section driving shaft 127 is fastened in this embodiment to the gear wheel 54 (See FIG. 4) and is accommodated inside the box 123, like the driving shafts between the rotors 4 and 5, 5 and 6, 6 and 7. The center lines of these driving shafts are aligned. The driving shafts 127 are passed through an opening in the housing of each gear box 124 (FIG. 13) and are journalled in bearings 128. The ends of the driving shafts 127 in the gear boxes are provided with bevel gear wheels 129 being in mesh with a bevel gear wheel 130 fastened to a rotary shaft 131, the center line 132 of which intersects at right angles to the registering centre lines of the two adjacent shafts 127. The center line 132 is directed upwardly and occupies in operation, the same position as the center line 79 in the preceding embodiments. The rotary shaft 131 extends beneath the two adjacent driving shafts 127 and is supported on its lower end by a bearing 133 on the bottom of the gear box 124. The gear box 124 is provided on its top side with a detachable cover 134, which is fastened by means of bolts 135 to the gear box 124. The cover 134 has a bearing 136 holding the rotary shaft 131 and preventing an axial displacement of said shaft. On the front and rear sides of the gear box 124, viewed in the direction of movement A, ears 137 (FIG. 12) are provided for fastening the gear boxes 124, which have the boxes 123 secured thereto with the aid of bolts 138 to the portions 67A and 71 of the lid, one ear 137 being secured adjacent the rear side of the gap in the lid 71 and the other ear being secured adjacent the front side of said gap. The ears 137 are secured to the gear box 124 at such a level that in the mounted state, at least 60% of the height of the gear box 124 is located below the portion 71. The bottom of the gear box 124 bears on the bottom 69 of the beam 66. Said elongated opening in the lid 71 has a width slightly exceeding the width of the gear box 124, measured in the direction of movement A. Midway the direction of length of each box 123 between two gear boxes 124 a cavity 139 is provided at the front of said box for matching in the mounted state the front sides of the two corresponding supporting beam portions 62 and 63 over a comparatively short distance on either side of the plane of separation between said supporting beam portions.

The top end of the rotary shaft 131 is surrounded by a hub 140, which is fastened to said shaft by means of a key. The hub 140 has fastened to it at a short distance one above the other two plate-shaped members, both having at least partly the shape of a portion of a conical surface, the axis of symmetry coincides with the center line 132. The topmost one of these plate-shaped members, the supporting member 141, the outer rim of which is circular and the diameter of which is approximately equal to the width of the beam 66, measured in the direction of movement A, holds four cutters 143. The lower one of said two members, the supporting plate 142, is bent outwardly near its circumference approximately at right angles to the center line 132 and is directly secured to the supporting member 141 at an area located slightly inside the fastening area of the cutter 143 measured in a radial direction. The supporting plate 142 is furthermore provided with a cylindrical screening rim 144, coaxial to the center line 132 and having a diameter such that it narrowly surrounds the stiffening part 72, whereas its lower edge is located just above the top surfaces of the cover portions 67A and 71. Each cutter 143 is secured to the supporting member 141 by means of a pin 145, the center line of which is perpendicular to the surface of the supporting member 141, the center line being at an angle of approximately 15° to the center line 132 of the rotor concerned. Each cutter 143 is shaped, viewed parallel to the center line of the pin 145, similar to two joined rectangles (FIG. 12). The pin 145 is arranged near one of the ends of one of the rectangles, centrally between the long sides of said rectangle. At the end of said rectangle remote from the pin 145, a second rectangle joins the former so that the angles between the long sides of the two rectangles amount to 140°. In operation the cutters 143 occupy the position shown in FIG. 12, in which the said first rectangle joining the pin 145 is approximately tangentially to the further part of the rotor, whereas the long sides of the adjacent rectangle are, viewed in the direction of rotation B, at an angle of about 45° to the radial line going through the junction of the long sides of the two rectangles near one a cutting edge 146, located behind said radial line. The cutter 143 formed by the two rectangles described above is made from a single sheet of spring steel extending parallel to a tangential plane to the conical surface at the area of the pin 145 on the top side of the supporting member 141. The cutter is prevented in operation by a pin-shaped stop 147 from moving outwardly or radially when swinging around the pin. The distance between the pin 145 and the stop 147 is approximately equal to half the length of the cutter 143. The stop 147 engages, in operation, the long side of the first rectangle located near the outer edge of the supporting member 141. The cutting edge 146 is, therefore, in operation not in a radial position, but it as at angle of about 50° to a radial line on the rear side, viewed in the direction of rotation B. The supporting member 141 has a second stop 148, which limits the inward movement of the cutter 143 around the pin 145. The long side of the second, outermost rectangle opposite the cutting edge 146 engages the stop 148.

The outermost head face of the outermost supporting beam portion 65 is closed by a ridge 149 (FIG. 1), which is inclined inwardly directly behind the rear rim of the supporting beam portion 65, that is to say, towards the plane of symmetry of the tractor 9. To this bent rear end of the ridge 149 is secured a swath board 150, which is secured to the bent rear side of the ridge 149 by means of a spring structure 151. The swath board 150 comprises a vertical plate 152, the lower side of which glides in operation along the ground and is provided with a flange 153 bent over in a horizontal direction and extending away from the plate 152 towards the rotors 4 to 7. On the top side of the plate 152 a flange 154 is provided in a similar manner, which flange also extends in a horizontal direction and in the direction of the rotors. The flange 154 has, viewed on plan, an essentially triangular shape, the larger width being located near the rear side of the plate 152, said width exceeding the width of the lower flange 153.

In operation the machine is in the state illustrated in FIG. 1, in which the center lines 79 or 132 of the rotors 4 to 7 are parallel to one another and are all located in a plane whose line of intersection with the ground is almost at right angles to the direction of movement A. The power take-off shaft of the tractor 9 is coupled by means of an auxiliary shaft with the ingoing shaft of the housing 27 and hence also with the rotary shaft of the pulley 29. The rotational movement is converted by means of four belts 29A of the pulleys 29 and 33 into a rotational movement of the shaft 35 of the gear box 31. Owing to the rotary movement of the pulley 33, whose diameter is about 60% of that of the pulley 29, the bevel gear 43 and the engaged bevel gear wheel 50 of the same size are rotated. This rotation is transferred by the shaft 48 to the gear wheel 53, which is in mesh with the subjacent gear wheel 54, so that the driving shafts 50 and 127 respectively are rotated. This rotation is converted at each rotor by means of the gears 87 and 88 into a rotation of the shaft 78 and by means of the bevel gear wheels 129 and 130 into a rotation of the shaft 131 of the rotor and subsequently via the gear 129 and the corresponding driving shaft 127 to the adjacent rotor, etc. The transmission ratio between the pulleys 29 and 33 and the transmission ratio in the gear box 31 with the gear wheels 53 and 54, the screws 87 and 88 and the bevel gear wheels 129 and 130 are such that with a normal speed of rotation of the tractor 9 (for example 540 rev/min.) the speed of rotation of each of the rotors in both embodiments exceeds 3500 rev/min. and preferably amounts to about 4000 rev/min. The diameter of the rotors at this speed of rotation is more than 25 cms. and smaller than 50 cms. The number of rotors required for obtaining a working width of 160 cms. is at least four. It is preferred to use a comparatively great number of cutters that extend over a commparatively small distance beyond the rotor circumference and it is attempted to attain a comparatively small weight of each cutter. The bulk of a steel cutter has to be smaller than 5 cubic cc. In this embodiment the rotor diameter is 38 cms: each of the four cutters on each rotor has a length of 8 cms, a width of 3 cms and a thickness of 1 mm. (2.4 cms$^3$) and the cutter projects over 5 cms beyond the rotor circumference.

The machine has a cutting speed (measured midway the projecting portion of each of the cutters) of at least 85 ms/sec, preferably 90 ms/sec or more with a rotor diameter of less than 50 cms. and more than 25 cms. In this embodiment the cutting diameter is $38 + (2\times2.5) = 43$ cms at a speed of rotation of about 3780 rev/min, the cutting speed being then about 85 ms/sec and at a speed of rotation of 4000 rev/min, the cutting speed is 90 ms/sec. An important result of the comparatively high speeds of rotation is the potential light-weight structure of the drive, since the torque to be transmitted by the driving gear is comparatively small. This also has its influence on the construction of the whole frame and the rotors so that an over-all weight of the machine of 150 kgs can be attained. With this high cutting speed in conjunction with said variation in rotor diameters, the power required for driving is a function of the speed of travel appears to be relatively low. It is advantageous to use cutters of very light weight so that each cutter can readily deflect when striking obstacles and the risk of damage is comparatively small. It is possible to have each cutter project 5 cms at the most beyond the rotor circumference, while a value of about 3 cms may suffice in practice.

In operation the lower side of the supporting beam 3 is at a very small distance above the ground and the outermost, end of the supporting beam 3 bears on the ground via ridge 149, while it is possible to vary the portion of the ridge 149 projecting beneath the supporting beam. The rotors 4 to 7 are driven so that they rotate pairwise in opposite senses and rotors 4 and 5 have the directions of rotation D and E respectively (FIG. 1). During rotation, the paths of the extreme tips of the cutters 94 and 143 overlap one another. since the lower side of the ridge 149 will follow the uneveness of the ground, the supporting beam 3 will swing up and down in operation about the pivotal shaft 32. When the supporting beam 3 projecting completely beyond the tractor strikes an obstacle, it is capable of deflecting rearwardly together with the supporting member 2 about the pivotal shaft 15 to avoid damage. This deflection is enabled by the known safety device 20. In operation the lower side of the cover 56 will also slide along the ground and thus follows the unevenesses of the ground. The resultant upward and downward movement of the cover 56 is because supporting tubing 18 can turn about the pivotal shaft 17. When the machine has to be changed over to a transport position, the whole machine is lifted by lifting arms 11, the rocker 21 then turning about the pin 10 since the foremost end of said rocker is located beneath the lifting arm and since the relative positions of the lifting arms and the machine frame are changed, the supporting arm 3 will swing about the pivotal shaft 32 into the position indicated in FIG. 2 by dotted lines. This turn is rendered possible by the upward turn of the rear end of the rocker 21 due to said change in positions of the lifting arms 11 and the machine frame, said upward turn being transferred via the bars 24 and 25 and the lever 22 to the lever 26 rigidly secured to the supporting arm 3. The dish 99, which is freely rotatable about the shaft 78, will rotate in the same direction as the remaining part of the associated rotor rotating at a high speed. This rotation of the dish 99 is brought about inter alia by the air stream produced between the dish 99 and the supporting member 89 by the rotation of the supporting member 89 and by friction. Since the top surface of each cutter 94, viewed against the direction of rotation C (FIG. 7) is directed upeardly and an upright air stream is locally produced, the cut crop is thrown in an upwardly inclined direction and the high speed of rotation of the rotors with the high speed of travel of the machine the crop arrives at the rotating dish 99 and is conducted away in a rearwardly inclined direction between the two rotors rotating in opposite senses. The cutters 94 (FIGS. 7 to 9) will take up radial positions owing to the centrifugal force and when striking obstacles they can deflect rearwardly about the pin 103 and return immediately to the radial position after having passed the obstacle. In FIG. 9, the cutter 94 is in contact with the stop 108 also under the action of the spring 112, the cutter can deflect at the most back to the position shown in broken lines, when striking an obstacle, where it is in contact with the stop 109. After having passed by the obstacle the cutter 94 will very rapidly return to the radial position in contact with the stop 108. The cutter 94 is thus prevented during its return movement, from turning too far around the pin 103 due to its inertia forces and from regaining the radial position. It is thus ensured that no portions of crop remain uncut, which would give rise to an irregular mown surface. The embodiment shown in FIGS. 10 and 11 uses a working member for mowing, which is also particularly suitable for operating with the aforesaid very high speeds of rotation. The lengths of spring steel 119 operates in this case as a chopping member and will thus have a considerably longer lifetime than the cutters 94, which become blunt fairly soon and which have repeatedly to be taken off for grinding or replacement. The chopping portion 119 will have a markedly longer lifetime than a traditional mowing cutter. The chopping portion 119 is furthermore more insensitive to damage than the conventional cutters. When striking obstacles, the chopping portion can deflect furthermore owing to the coils 118. It should furthermore be noted that the cost price of the working member shown in FIGS. 10 and 11 is markedly lower than that of the conventional cutters.

During the manufacture of the machine shown in FIGS. 3 to 6 the deep-drawn sheet portions of the hollow beams 66 forming the spherical support 68 and the bottom 69 are provided with the lid parts 67 and 71 by welding. By means of the bolts 74, the gear boxes 74 are mounted on the supporting beam portions 62 to 65. These gear boxes 73 are provided with the lids 80 and 81, the packings 82, the bearings 83 and 84 and the gears 87 and 88. The supporting beam portions 62 and 65 are then arranged side by side in a jig as illustrated in FIG. 1 so that the rear edges of said supporting beam portions, viewed on plan, form one straight line. Then the side faces of the supporting beam portions lying at right angles to said rear edge are welded to one another. Subsequently and prior to the arrangement of the ridge 149, the shaft 60 formed by a single piece throughout the length of the supporting beam 3 is inserted from the end intended for fastening the ridge 149 into the supporting beam portion 65, the driving shaft 60 being inserted with the aid of the feeler-like surfaces 85 and 86 through the openings in the lids 81 into the screw wheels 87. After the driving shaft 60 has passed through the gear box 73 of the rotor 7, it is pushed further in the same manner through the corresponding parts of the further rotors until it projects over the desire distance beyond the head surface of the supporting beam portion 62 to be secured to the mounting lid 56, where the gear 54 can be fastened. It should be noted that the screw 87 has been fixed substantially at its definite place before the shaft 60 is passed through, since the 87 is held in place by the inner rings of the bearings 83 and 84. Passing through theh shaft 60 can be facilitated by not tightening the bolts 74 (FIG. 5) initially and by securing the gear boxes 73 definitely to the row of beams 66 after the shaft 60 is brought into its position. It should furthermore be noted that prior to the insertion of the shaft 60, the rotors have to be arranged in positions as shown in FIG. 1, which means that each rotor (having four cutters) has to be set in a position off-set over 45° with respect to the position of the adjacent rotor. These positions can, of course, be fixed in the welding and/or mounting jig. Since the gear boxes 73 are arranged very deeply in the supporting beam portions, the height of the supporting beam may be very small.

In assembling the machine in the embodiment shown in FIGS. 12 to 14 first the boxes 123 and the gear boxes 124 are then not yet provided with the supporting member 141. The central supporting portion of the arm 3 thus assembled is then arranged in the elongated opening of the welded supporting beam portions 62 to 65. The driving shafts 127 are then already available in the boxes 123. The supporting beam portions 62 and 65 are subsequently secured by means of the bolts 138 to the gear boxes 124 and owing to the presence of the boxes 123 also to the supporting portion, the front sides of the supporting beam portions engaging the boxes 123 with the given amount of tension. Also, in this case the spherical supports 68 and the portions 67A and 71A located behind the boxes are welded together behind the boxes so that a satisfactory closure is obtained between the boxes 123 and the gear boxes 124 on the one hand and between the supporting beam portions 62 to 65 on the other hand. Also, in this embodiment, the height of the supporting beam may be small, since the gear boxes extend down to the bottom.

The cutters 143 arranged on the rotors in the last-mentioned embodiment and formed by two portions constituting a single unit and being at an obtuse angle to each other, are forced against the stop 117 by the centrifugal force so that, when striking an obstacle, they exert a heavy counter-force on the obstacle. This counter-force is maintained even when the cutter 143 is returned to the stop 148. The return of the cutter 143 is therefore performed up to the very position of operation by the full effect of the centrifugal force. In this way, when the working position is regained, undesirable vibrations of greater amplitudes are avoided. Since the cutting edge 146 is located behind the associated radial line and is at an angle to said radial line, a very small, reduced cutting edge is obtained, while the cut crop is moved not only in an upwardly inclined direction but also in a radial direction away from the cutter, so that also due to the high speed of travel and the high speed of rotation, the crop is moved over and across the rotors to be deposited on the ground behind the supporting beam 3.

The invention is not restricted to what is indicated in the description and/or the claims, but is also relates to the details of the drawings.

I claim:

1. A rotary mowing machine comprising a frame with coupling means connectable to a tractor having a power take-off, said frame comprising an elongated hollow beam having support means and said beam extending adjacent the ground and transverse to the direction of travel during operation of the machine, a plurality of upwardly extending shafts extending through said support means and said shafts being arranged side by side, said shafts being drivingly connected to a high speed drive shaft for operative rotation about respective axes, said drive shaft being located within said beam and extending generally parallel to the longitudinal axis of said beam, bearing means secured adjacent the bottom of said beam and the lower portions of said shafts being mounted in said bearing means, a plurality of rotors with cutting elements mounted on said shafts and said rotors being driven by said drive shaft through their respective shafts, the speed of rotation of said cutting elements being at least 3500 r.p.m., each of said rotors having a dish-shaped disc with a convex side facing away from said support means, cutting elements being mounted on said disc and positioned to cut crop material during rotation of said rotors.

2. A rotary mowing machine comprising a frame with coupling means connectable to a tractor having a power take-off, said frame comprising an elongated hollow beam having cover means and said beam extending adjacent the ground and transverse to the direction of travel during operation of the machine, a plurality of upwardly extending shafts extending through said cover means and said shafts being arranged side by side, said shafts being drivingly connected to a high speed drive shaft for operative rotation about respective axes, said drive shaft being located within said beam and extending generally parallel to the longitudinal axis of said beam, bearing means secured adjacent the bottom of said beam and the lower portions of said shafts being mounted in said bearing means, further bearing means secured within said beam acjacent said cover means and said shafts being journalled in said further bearing means, a plurality of rotors with cutting elements mounted on said shafts and said rotors being driven by said drive shaft through their respective shafts, the speed of rotation of said cutting elements being at least 3500 r.p.m., each of said rotors having a dish-shaped disc with a convex side facing away from said cover means, cutting elements being mounted on said disc and positioned to cut crop material during rotation of said rotors.

3. A rotary mowing machine as claimed in claim 2 wherein said beam is comprises of side-by-side beam portions and each of these portions forms a base support for one of said rotors, said beam portions being fastened to one another and said cover means being positioned over said driving shaft to completely house same.

4. A rotary mowing machine as claimed in claim 3 wherein each beam portion is a concave curved plate and adjacent curved plates are welded to one another.

5. A rotary mowing machine as claimed in claim 4 wherein each curved plate is enclosed with a corresponding upper lid of said cover means, said bearing means and said further bearing means comprising gear housings that are secured to said lid.

6. A rotary mowing machine as claimed in claim 5 wherein said lid has an upwardly extending circular stiffening part and a cylindrical rim on each respective dish-shaped disc surrounds said stiffening part to form a barrier against dirt.

7. A rotary mowing machine comprising a frame with coupling means connectable to a tractor having a power take-off, said frame comprising an elongated hollow beam having cover means and said beam extending adjacent the ground and transverse to the direction of travel during operation of said machine, a plurality of upwardly extending shafts extending through said cover means and said shafts being arranged side by side, said shafts being drivingly connected to drive means for operative rotation about respective axes, said drive means being located within said beam, a plurality of rotors with cutting elements mounted on said shafts and said rotors being driven by said drive means through their respective shafts, each of said rotors having a disc and cutting means being mounted on the periphery of said disc in position to cut crop material during rotation of said rotors, each of said rotors having a dish-shaped top portion that is rotatable about the corresponding upwardly extending shaft for that rotor, said top portion being located above the cutting means to guide crop being cut during operation.

8. A rotary mowing machine as claimed in claim 7 wherein said top portion is circular and freely rotatable about said corresponding upwardly extending shaft.

9. A rotary mowing machine as claimed in claim 7 wherein cutting elements are secured around the periphery of said disc and said top portion overlies said disc adjacent said cutting elements.

10. A rotary mowing machine as claimed in claim 7, wherein said top portion has an upper conical surface.

11. A rotary mowing machine as claimed in claim 7, wherein said top portion is journalled on said upwardly extending shafts with at least one bearing member.

* * * * *